(12) United States Patent
Ens et al.

(10) Patent No.: US 7,621,179 B2
(45) Date of Patent: Nov. 24, 2009

(54) DIAGNOSTIC SYSTEM AND METHOD FOR A VALVE, ESPECIALLY A CHECK VALVE OF A POSITIVE DISPLACEMENT PUMP

(75) Inventors: Wolfgang Ens, Linkenheim (DE); Alf Püttmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 303 days.

(21) Appl. No.: 10/556,829

(22) PCT Filed: May 14, 2004

(86) PCT No.: PCT/EP2004/005193

§ 371 (c)(1),
(2), (4) Date: Nov. 15, 2005

(87) PCT Pub. No.: WO2004/102052

PCT Pub. Date: Nov. 25, 2004

(65) Prior Publication Data

US 2006/0254357 A1 Nov. 16, 2006

(30) Foreign Application Priority Data

May 16, 2003 (DE) ................ 103 22 194

(51) Int. Cl.
*G01M 19/00* (2006.01)
(52) U.S. Cl. .......................... 73/168; 73/592
(58) Field of Classification Search ............. 73/587, 73/592, 168
See application file for complete search history.

(56) References Cited

U.S. PATENT DOCUMENTS

| | | | | |
|---|---|---|---|---|
| 4,896,101 A | * | 1/1990 | Cobb | 73/593 |
| 5,616,829 A | * | 4/1997 | Balaschak et al. | 73/40.5 R |
| 6,530,277 B2 | * | 3/2003 | Kumpfmueller | 73/592 |
| 6,637,267 B2 | * | 10/2003 | Fiebelkorn et al. | 73/587 |
| 6,976,503 B2 | * | 12/2005 | Ens et al. | 137/552 |

FOREIGN PATENT DOCUMENTS

| | | |
|---|---|---|
| DE | 199 24 377 A1 | 12/2000 |
| EP | 0 410 317 A2 | 1/1991 |
| EP | 0 637 713 A1 | 2/1995 |
| EP | 1 184 570 A2 | 3/2002 |
| JP | 08101091 A * | 4/1996 |
| JP | 2002041143 A | 2/2002 |

* cited by examiner

*Primary Examiner*—Hezron Williams
*Assistant Examiner*—Nashmiya S Fayyaz

(57) ABSTRACT

A diagnostic system and method for a valve, especially a check valve of a positive displacement pump, including at least one solid-borne sound sensor is provided. A first value of a parameter of a sound signal recorded in the closed state of the valve and a second value of a parameter of a sound signal recorded in the open state of a valve are determined essentially. A signal indicating a disturbance is issued if the deviation between the first value and the second value exceeds a predefined threshold value, resulting in particularly good insensitivity.

4 Claims, 2 Drawing Sheets

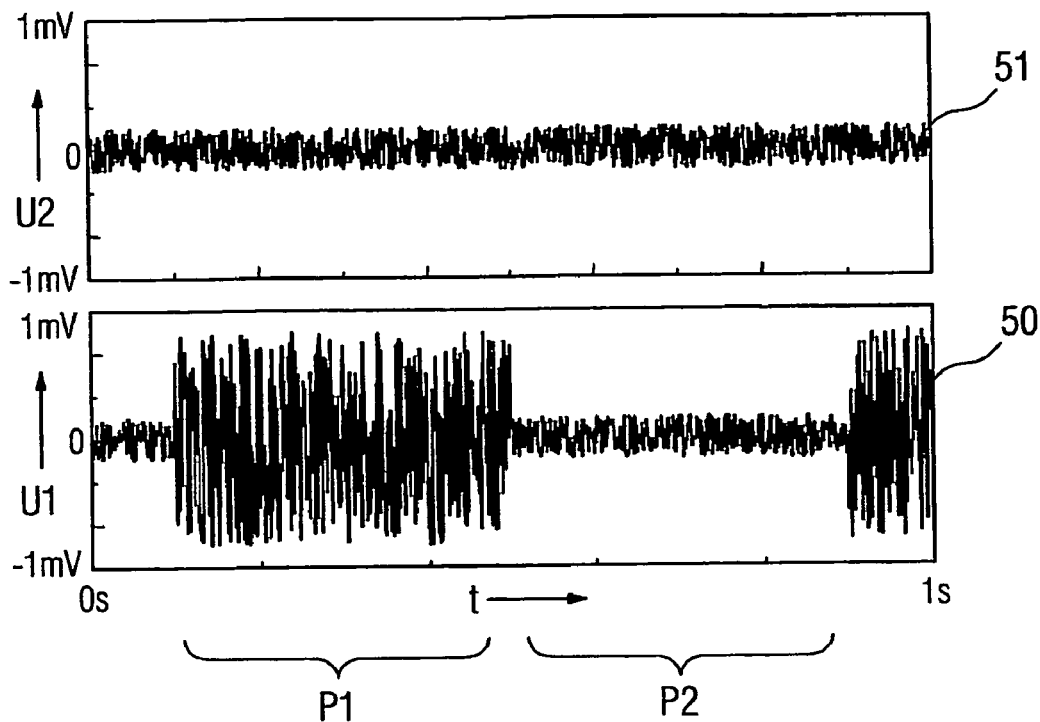
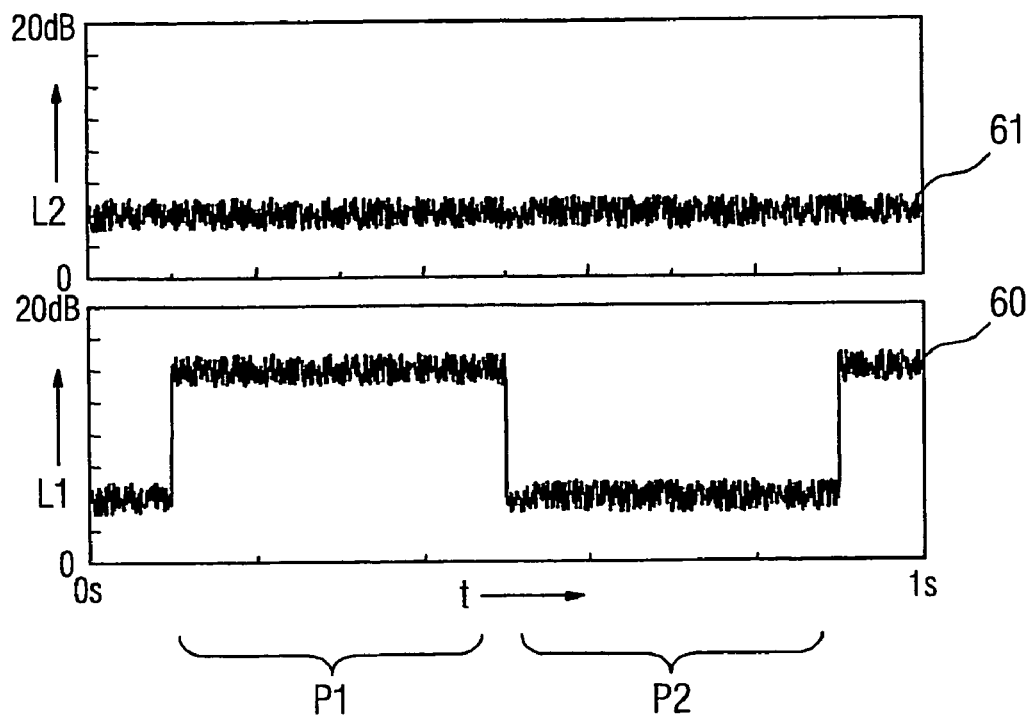

DIAGNOSTIC SYSTEM AND METHOD FOR A VALVE, ESPECIALLY A CHECK VALVE OF A POSITIVE DISPLACEMENT PUMP

The invention relates to a diagnostic system as well as to a diagnostic method for a valve, especially a check valve of a positive displacement pump.

CROSS REFERENCE TO RELATED APPLICATIONS

This application is the US National Stage of International Application No. PCT/EP2004/005193, filed May 14, 2004 and claims the benefit thereof. The International Application claims the benefits of German application No. 10322194.8 DE filed May 16, 2003, both of the applications are incorporated by reference herein in their entirety.

FIELD OF INVENTION

In many areas of process control and energy technology the fault-free operation of a system depends on the smooth functioning of the control and check valves used. To avoid cost-intensive, irregular interruptions to operation, damage to valves should where possible be detected right at the outset, that is before a failure of the valve can result in a shutdown of the plant. For example defective valve seats result in leakage flows which generate a wideband sound emission. Recording and evaluation of the sound emission of a valve can thus be used for early detection of valve damage. Since valve faults can lead to damage and resultant high costs a diagnosis, possibly with automatic recording and programmable evaluation of the faults, is of great benefit. Statistical evaluations of the diagnostic data can be used both for optimizing the maintenance process and for timely replacement of a damaged valve as well as for qualitative assessment and classification by the valve manufacturer or for assessment of the suitability of particular valves for different types of process.

A diagnostic system is known from DE 199 24 377 A1 for a valve which can be actuated by a position controller via a drive, which features a device for recording, storage and evaluation of solid-borne sound spectra measured at the valve. To make an especially reliable valve diagnosis possible a solid-borne sound spectrum of recorded for a slightly open, intact valve can be stored in the device for recording, storage and evaluation. For diagnosis a solid-borne sound spectrum recorded for a closed valve is compared to the spectrum stored and the similarity is employed as a criterion for the lack of seal of the valve. The known diagnostic method has the disadvantage that an exact positionability of the closing element is required so that a comparison spectrum for a slightly open, intact valve can be recorded for simulation of a valve leakage. It is thus not applicable to a plurality of valve types, for example check valves for positive displacement pumps.

A further diagnostic system is known from EP 0 637 713 A1 for regulation and cut-off valves. The sound level is measured during the operation of the valve with a solid-borne sound sensor. This is compared with the sound level previously recorded for the good state for a new valve and stored as a reference value. If the deviation between current state and good state exceeds a predetermined limit value an alarm is triggered. This known method is associated with the following disadvantages:

BACKGROUND OF INVENTION

The sound level measured in the good state is predominantly caused by plant noises which for example are coupled in via pipe connections. These can change after calibration. If they become larger there is a possibility of a false alarm being triggered. If the plant noises become smaller during the course of operation this leads to a reduction in measurement sensitivity since the threshold value predetermined was too high. In addition the measurement of the sound level in the good state involves additional expenditure during commissioning. With operating conditions which vary greatly for the valve under investigation the diagnostic method cannot be employed because the plant sounds are heavily dependent on the operating conditions. For check valves of positive displacement pumps especially the method cannot be used under these circumstances since measurements have shown that the system noise always depends on the operating pressure and this rises by around 20 dB if there is a change in pressure from 5 to 50 bar.

An underlying object of the invention is to create a diagnostic system and a diagnostic method which react less sensitively to changes in the noise of the system.

To achieve this object the new diagnostic system of the type mentioned at the start has the features mentioned in the claims or the diagnostic method has the features mentioned in the claims. Advantageous developments are described in the dependent claims.

For a reliable detection of a leakage the leakage noise for a closed valve and the leakage noise for an open file are recorded almost simultaneously and compared with one another. The two measurement times can be all the closer to one another the shorter the gap is between the two states "valve open" and "valve closed". In the special case of an application of the diagnostic system to check valves in oscillating positive displacement pumps the valves are periodically opened and closed. Since the two check valves assume it precisely opposite states at specific times the leakage noise can be recorded at one valve while at precisely the same time the plant noise is recorded at the other valve. The noises can be assigned to the relevant valve state in a simple way by suitable signal processing. In principle the diagnosis can however be performed in this case with just one solid-borne sound sensor which then records the leakage noise and the plant noise in the closed or open state of the same valve respectively in chronological order. However in this case the new diagnostic system has the advantage that it is largely insensitive to gradual changes in operating conditions.

Correspondingly the new diagnostic system and a new diagnostic method can be applied for valves in piston compressors which operate in accordance with a largely similar principle.

The diagnostic system has an especially low sensitivity to wide variations in operating conditions if the first value and the second value of the characteristic variable which are compared with each other are determined on the basis of the sound signal last recorded in the closed or the open state. In this case it can be assumed that the plant's noises in the intervening period have in any event only changed slightly and thereby barely affect the diagnosis result in any way.

In an application of the system to diagnosis of a check valve of a positive displacement pump it is advantageously sufficient to have especially low expenditure for measuring system components if the evaluation device is embodied such the respective state of the valve can be determined by it on the basis of the recorded sound signal. In this case no further means for recording the position of the closing element is necessary. The system can make do with just one sound recorder for a measuring point.

BRIEF DESCRIPTION OF THE DRAWINGS

The invention, along with its embodiments and advantages, is explained in greater detail below with reference to the drawings in which an exemplary embodiment of the invention is shown.

The Figures Show.

DETAILED DESCRIPTION OF INVENTION

Figure 1:
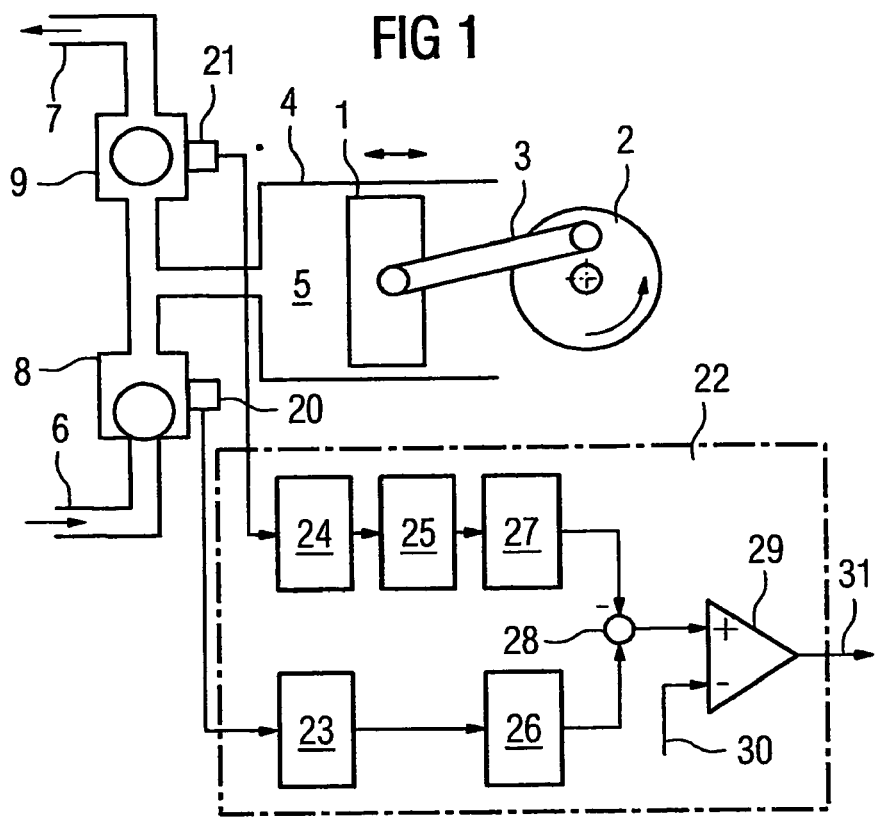
FIG. 1 a positive displacement pump with a diagnostic system with two solid-borne sound sensors, FIG. 2 a positive displacement pump with a diagnostic system with one solid-borne sound sensor, FIG. 3 Waveforms of solid-borne sound signals recorded at the positive displacement pump according to FIG. 1 and FIG. 4 sound levels calculated on the basis of the waveforms shown in FIG. 3.
Figure 2:
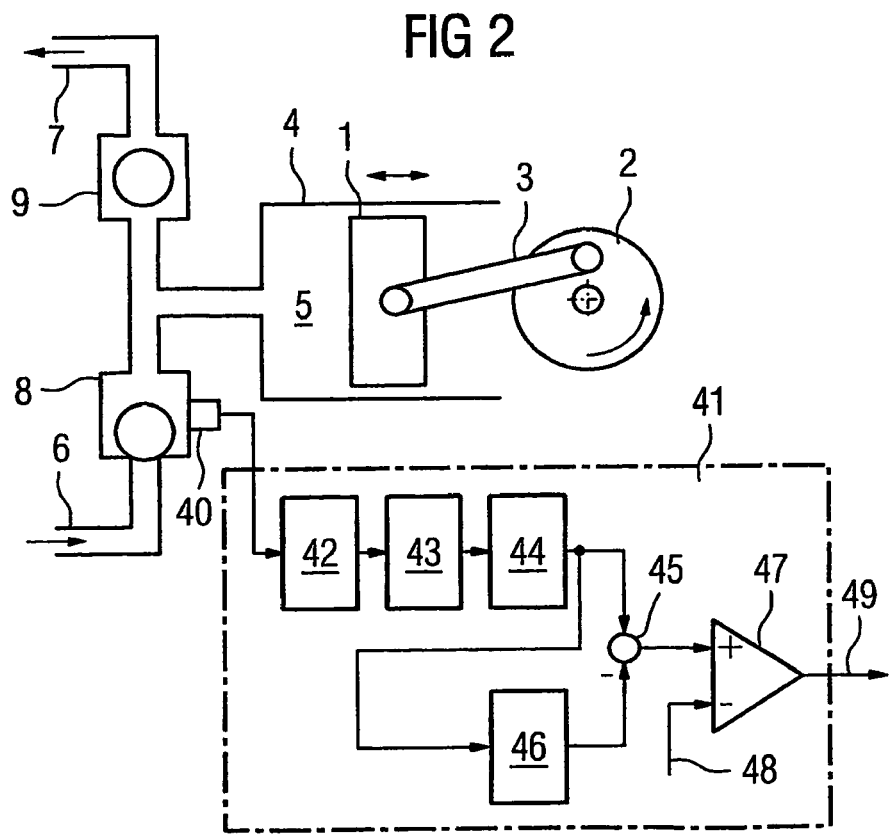

FIGS. 1 and 2 each show a positive displacement pump along with its basic layout. The same parts are identified by the same reference symbols in the two Figures. The functional principle of a positive displacement pump is thus explained below with reference to the example shown in FIG. 1. A piston 1 is moved alternately left and right in a cylinder 4 by a crankshaft 2 with a connecting rod 3. This produces a variable volume 5 in cylinder 4. Check valves 8 or 9 are arranged in an inlet 6 and in an outlet 7 to this volume 5 respectively. These check valves are frequently also referred to as inlet or outlet valves. If the volume 5 reduces as shown in the phase depicted in FIG. 1, check valve 9 opens and a medium to be delivered flows out to the outlet 7. At the same time valve 8 is closed. With an enlargement of the volume 5 on the other hand, valve 8 opens so that the medium can flow into the inside of cylinder 4. The valve 9 closes the outlet 7 and thereby prevents flowback of the medium already delivered. One valve is thus closed and the other is opened respectively in both delivery phases. The change between these states occurs cyclically and with a largely constant duration.

FIG. 1 further shows a diagnostic system with two sensors 20 and 21 which are arranged at valve 8 or 9 respectively. In an evaluation device 22 the solid-borne sound signals recorded with sensors 20 and 21 are initially bandpass filtered with a filter 23 or 24 respectively. This filtering especially eliminates the impact noises which occur when the closing element hits the valve seal seat. In this filtering salient resonant frequencies of the system in which the valves are located can additionally be filtered out. The filtered sound signal of valve 9 is fed to a device 25 for determining the valve state in which it is also established whether the valve 9 is currently closed or open. In the open state the solid-borne sound sensor 21 essentially delivers the plant noise since the medium can flow freely through valve 9 and thereby only a low noise level is created by the flow. If on the other hand valve 9 is closed in another delivery phase, the sound signal recorded by the sensor 21 is predominantly caused for a defective valve by the leakage flow which is overlaid on the plant noise. For example, by means of auto correlation, device 25 detects the duration of the cyclic state transition and the relevant delivery phase. The further evaluation of the signals is undertaken in a suitable way synchronized to the delivery phases. From the filtered sound signals of the sensor 20 and 21 the sound level for the closed valve 8 or the open valve 9 is subsequently calculated in the downstream devices 26 or 27. The two calculated sound levels are compared with each other by a device 28. In this case the sound level of the open valve acts as a reference level. It is thus subtracted from the sound level of the closed valve 8. The difference between the two sound levels thus created is compared in a comparator 29 with a predeterminable threshold value 30. If the difference exceeds the predeterminable threshold value 30, the comparator 29 creates an alarm signal 31 which is passed on to a control station, which is omitted from the diagram for reasons of clarity, so that suitable measures for rectifying the fault can be initiated.

Instead of the device 25 for determining the valve state, this state could be recorded in an alternative to the exemplary embodiment shown by additional sensors. For example the valve state could be recorded by a position generator as are normally used with control valves. Since however the valve state can already be determined on the basis of the sound signal itself, no additional sensors are required for determining the valve state.

A further alternate embodiment is shown in FIG. 2. Here only one sensor 40 is used for solid-borne sound, of which the recorded sound signal is processed in an evaluation unit 41. A filter 42 and a device 43 for determining the valve state can be embodied in the same way as filter 24 and the device 25 already described with reference to FIG. 1. The same applies to calculating the sound level from the filtered sound signal in a device 44. As well as the value of the sound level being fed directly to the comparison device 45 this value is now also fed to a delay unit 46 in which the value stored and delayed by a half-period is output. The currently calculated sound level which, for closed valve 8, essentially stems from the leakage noise, is thus compared with a stored value of the sound level in the device 45 which was determined a half-period before, thus corresponds to the sound level for open valve 8 and was predominantly triggered by the plant noise. The difference between the current sound level and the stored reference level is again fed to a comparator 47 which compares this difference with a predeterminable threshold value 48 and creates an alarm signal 49 if this threshold is exceeded. This embodiment has the advantage that the second sensor for solid-borne sound can be dispensed with.

The evaluation units 22 and 41 shown by function blocks with reference to FIGS. 1 and 2 are in practice implemented by a microprocessor circuit with a suitable evaluation program. Implementation with similar modules is of course possible in principle.

FIG. 3 shows waveforms 50 and 51 of filtered sound signals, such as can be recorded for example at an intact valve 8 (FIG. 1) and a defective valve 9 (FIG. 1). The time in seconds is plotted on the abscissa, the Amplitude U1 of the one sound signal and the amplitude U2 of the other sound signal respectively in mV are plotted on the ordinates. The sound signals have an essentially periodically repeating waveform. A period begins for example with a delivery phase P1 in which the defective valve 8 is open and the intact valve 9 is closed. Because of the leakage noise the sound amplitude U1 measured at valve 8 is considerably higher than that at valve 9. In the other delivery phase P2 in which the intact valve 9 is closed and the defective valve 8 is open, there is practically no leakage flow in the intact valve 9 and both signal waveforms approximately correspond to the plant noise. After the end of the delivery phase P2 the next period begins with a further delivery phase P1. Because of this periodicity it is possible in a simple manner to determine the relevant valve state on the basis of the sound signal recorded.

FIG. 4 shows associated waveforms 60 and 61 of the calculated sound levels L1 and L2, which are entered on the two ordinates in dB. This Figure shows the same periods of time as those already shown in FIG. 3. In the delivery phase P1 the sound level L1 for the defective valve 8 (FIG. 1) is significantly greater than the sound level L2 of the intact valve 9 (FIG. 1) which serves here as reference level. The difference thus exceeds the predeterminable threshold value 30 (FIG. 1) and an alarm signal 31 (FIG. 1) for indicating a defective valve is output. In delivery phase P2 on the other hand the predeterminable threshold value is not exceeded by the difference between the two sound levels L1 and L2. The valve 9 is thus recognized as intact.

On the basis of these waveforms it can be clearly seen that an advantage of the new diagnostic system and method is that the evaluation adapts in a "self-learning" way to the existing system conditions in each case, since in each operating cycle of the valve a reference value and a measurement value are calculated. This simplifies parameter setting for the evaluation device and the diagnostic system can advantageously be used for wide variations in system noise. Only one solid-borne sound sensor is also needed for a diagnosed valve in this case. The relevant state of the valve, whether open or closed, can be easily determined on the basis of the recorded sound signal without additional measuring devices.

The invention claimed is:

1. A diagnostic system for a check valve of a positive displacement pump having a solid-borne sound sensor, comprising:
    a calculating device configured to calculate a first operative sound level of a first value of a first operative sound signal recorded in a first state of the valve induced during operation of the pump and to determine a second operative sound level of a second value of a second operative sound signal recorded in a second state of the valve induced during operation of the pump, wherein the first sound value is determined based on a current sound signal recorded in the first state of the valve and the second sound value is determined based on a last sound signal recorded in the second state of the valve, the last sound signal being a half period delayed and stored;
    a determining device configured to determine a relevant state of the valve via an auto correlation; and
    a signal output that displays a fault if a deviation between the first sound level determined for the first state of the valve and the second sound level determined for the second state of the valve exceeds a pre-determinable threshold value,
    wherein the sensor measures solid borne sound and records the sound signals.

2. The diagnostic system in accordance with claim 1, wherein the first value is determined based on a current sound signal recorded in the closed state of the valve and the second value is determined based on a last sound signal recorded in the open state of the valve.

3. The diagnostic system in accordance with claim 2, wherein the valve is a check valve of the positive displacement pump.

4. The diagnostic system in accordance with claim 3, wherein the determining device determines the valve state based on an auto correlation of the first sound signal recorded and/or an auto correlation of the second sound signal recorded.

* * * * *

UNITED STATES PATENT AND TRADEMARK OFFICE
CERTIFICATE OF CORRECTION

| | |
|---|---|
| PATENT NO. | : 7,621,179 B2 |
| APPLICATION NO. | : 10/556829 |
| DATED | : November 24, 2009 |
| INVENTOR(S) | : Ens et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 360 days.

Signed and Sealed this

Twenty-sixth Day of October, 2010

David J. Kappos
*Director of the United States Patent and Trademark Office*